Dec. 22, 1959     M. MULLER     2,918,622
MAGNETIC FLUX METER
Filed July 10, 1956
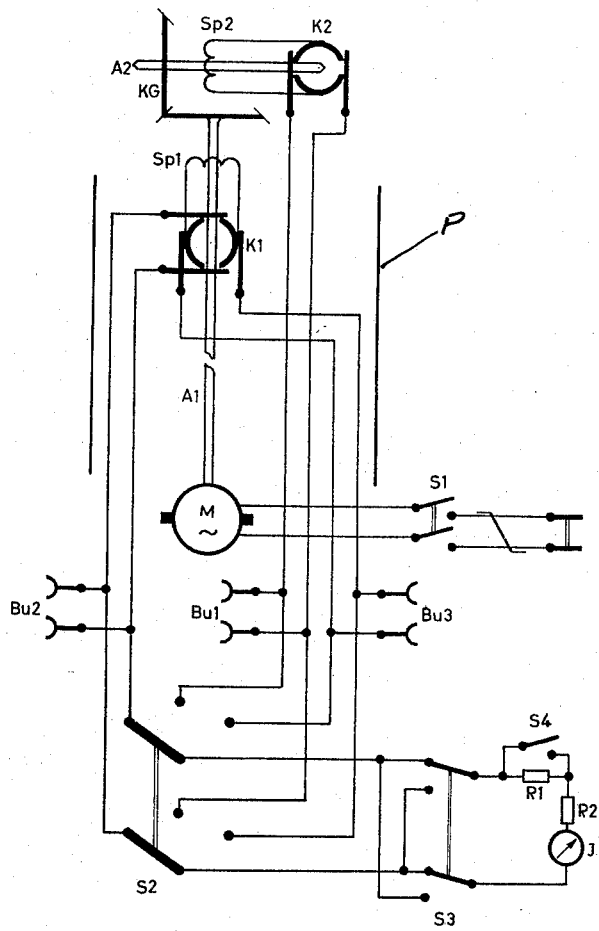
INVENTOR
M. MULLER
BY
ATTORNEY US Patent Office
2,918,622
Patented Dec. 22, 1959

2,918,622

MAGNETIC FLUX METER

Martin Muller, Pforzheim, Germany, assignor to International Standard Electric Corporation, New York, N.Y., a corporation of Delaware Application July 10, 1956, Serial No. 596,931

Claims priority, application Germany July 27, 1955

4 Claims. (Cl. 324—47)

The invention relates to an apparatus for measuring the three space components of a magnetic flux, in particular of coils and permanent magnet combinations of long-ray electron tubes, especially multi-cavity klystrons or traveling wave tubes.

In the case of very-high-frequency amplifiers, such as multi-cavity klystrons or traveling wave tubes, the active element of which is as a rule a long electron ray or electron beam of a high current density, arrangements have to be made for keeping the beam concentrated. This may be effected with the aid of a solenoid or by means of a magnetic field produced by permanent magnets in such manner that the cross-section of the beam will have no lateral components. The field of permanent magnet combinations largely depends upon the quality of the material employed. Hence there arises the problem of measuring the magnetic field, its desired components and its noise components extending transversely in relation thereto, to the order of 1% of the required characteristics, in order to effect any necessary corrections.

Conventional types of magnetic-field measuring instruments, in cases where the indication is obtained by a ballistic galvanometer or fluxmeter, have proved to be not sufficiently sensitive when having the admissible dimensions, to measure noise components in order of 1 gauss. On the other hand, rotating magnetic-field measuring instruments of the conventional types measure only one single component of the magnetic field which extends transversely in relation to the driving axis.

An object of the invention is to avoid these disadvantageous and to provide a fluxmeter which permits the measurement of the three space components of a magnetic field with respect to amount and direction in a simple and reliable manner. Dimension, arrangement and rotation speed of the measuring coils are thereby so chosen that measurements can also be performed inside a narrow, long and tubular space and that there is achieved the necessary sensitivity (in the order of the earth's magnetic field) by avoiding the employment of tube arrangements which are susceptible to interferences. Another advantage of the invention is that for measuring the three components there are used only two measuring coils of the same type, one of which, at the same time, measures two space components at the same point or place in the space.

The invention is characterized by the employment of two coils rotating in two planes extending vertically in relation to one another. One of these coils serves for selectively measuring two different field components, in that the associated collector is designed as a double-commutator with two pairs of brushes arranged vertically in relation to each other. For reasons of a further simplification the coils may be rotated by the same main driving shaft via bevel gearing. Preferably the axis of the main driving shaft extends in the direction of one co-ordinate axis. The feeder lines to the commutator brushes extend like the driving shaft within a bar-shaped or tubular probe.

Further features of the invention will be explained hereinafter with reference to the accompanying drawing showing one embodiment of the invention. In this figure there is shown also the basic circuit diagram of an embodiment according to the invention.

The clock-type synchro-motor M, via a long shaft A1, drives the coils Sp1 and Sp2 which are arranged at the end of a probe in the measuring head. The coil Sp2 is driven via a bevel wheel gearing KG and shaft A2. The speed of the motor and of the coils may be e.g. 3000 r.p.m. with a mains frequency of 50 c./s. The coil Sp1 is connected with the collector K1, and the coil Sp2 is connected with the collector K2.

The driving shaft A1 is assumed to be in alignment with the Z-axis of a cartesian co-ordinate system, and the shaft A2 with the X-axis of such a system. The Y-axis is then imagined to proceed through the crossing point of A1 with A2 vertically in relation to the plane of the paper. Hence when displacing the commutation plane of K2 into the Y-axis, then the coil Sp2 will measure the $B_z$-component of the field. Collector K1 is arranged as a double-commutator by means of two pairs of brushes arranged at right angles in relation to one another, and with commutation planes in the y- and x-axis; accordingly the coil Sp1 selectively measures the y- or the x-components respectively of the field.

Since the effects of the coils are not required to penetrate each other, the coils may be arranged at two different points in space. The arrangement of the invention enables a small spacing between coils of e.g. not more than 1 cm. Thus the employment of the double-commutator results in the saving of a third measuring coil with an associated collector. The arrangement of the rotating coil Sp1, which rotates around the longitudinal axis which is very exactly adjustable within the co-ordinate system, results in meeting the requirements as to accuracy, which is rather extreme having regard to the small dimensions of the assemblage, that is, of proving cross or quadrature axis components in the order of 1% of the longitudinal components. Furthermore, the invention bears the added advantage that both of the noise components can be measured at the same point in space.

From the six commutator brushes leads are conducted inside the bar-shaped probe P diagrammatically represented in the drawing, which also contains the driving shaft to a selector switch S2, with the aid of which a measuring instrument J may be selectively connected with the respective pair of brushes associated with the desired field component. The switch S3 serves to reverse polarity and the switch S4 is a range switch by means of which a portion R1 of the series resistance R1, R2, may be short-circuited.

The instrument itself may comprise a moving-coil measuring set with e.g. a 100 $\mu$ amp. full indication or more, and about 200 ohms internal resistance. The dial should be calibrated with 0–1000 gausses, and the two measuring ranges 200 and 1000 gausses should provide a full indication, whereby in the sensitive range differences of 2 gausses, are easily readable. The three pairs of brushes B$\mu$1–3 permit the connection of other voltmeters thus making it possible to enlarge the measuring ranges below and above at will. By means of a sufficiently sensitive galvanometer it is possible, with the aid of the fluxmeter of the invention, to easily demonstrate the earth's magnetic field with its three components.

In order to avoid faulty indications, care has to be taken when assembling the fluxmeter that no ferromagnetic materials are used for those parts of the measuring head which are subjected to considerable strain by the high speed of revolution. As a bearing or pivoting material, therefore, preferably molybdenum and bronze are used. Besides the bearings, the commutators are the parts which are subjected to most strain. Any interference originating with these parts would immediately give rise to an error in the readings. Preferably, therefore, spring type bronze wire is used as brush material, and silver graphite as the material for the collectors. Oil traces from the bearings are likely to form partly insulating layer or film and, due to their series resistance, are likely to falsify the readings. An increase of contact resistance, due to the wear of the feeder brushes in the course of time, will not, however, occur when using collectors of silver graphite, as has been proved by experiments. A smearing over or choking up of the commutator segments and, consequently, the occurring of a parallel resistance to the load instrument can be eliminated or avoided by correspondingly dimensioning the separating gap.

While I have described above the principles of my invention in connection with specific apparatus, it is to be clearly understood that this description is made only by way of example and not as a limitation to the scope of my invention.

What is claimed is:

1. Flux meter for measuring the three space coordinates of a magnetic field, comprising two coils, one of said coils adapted to sense selectively two different magnetic field components in quadrature and the other adapted to sense the third field component means for rotating said coils in planes at right-angles to one another, a measuring instrument, a first commutator collector connected to one of said coils, a first pair of brushes engaging said collector at diametrically opposite points, a second commutator collector connected to the other of said coils, second and third pairs of brushes respectively engaging said second collector at diametrically opposite points on diameters at right-angles to one another a tubular probe for housing said coils and collectors, and means for connecting said pairs of brushes to said measuring instrument.

2. Flux meter as claimed in claim 1 in which said means for rotating said coils comprises a motor and driving shaft, said shaft extending in the direction of one of the co-ordinate axes one of said coils being mounted on said shaft, a second shaft on which said other coil is mounted, said shafts being at right angles to each other and a bevel gear for transmitting motion from said driving shaft to said second shaft.

3. A flux meter as claimed in claim 1, wherein said last-mentioned means comprises a switch for selectively connecting said pairs of brushes with said measuring instrument.

4. A flux meter as in claim 3, further comprising a pole changer switch, interposed between said switch and said measuring instrument.

References Cited in the file of this patent

UNITED STATES PATENTS

| | | |
|---|---|---|
| 1,047,157 | Bliss | Dec. 17, 1912 |
| 1,472,342 | Pickard | Oct. 30, 1923 |
| 2,438,964 | Cunningham et al. | Apr. 6, 1948 |
| 2,519,094 | Zuschlag | Aug. 15, 1950 |
| 2,652,533 | Lush | Sept. 15, 1953 |